United States Patent
Lansford et al.

(10) Patent No.: US 8,467,284 B2
(45) Date of Patent: Jun. 18, 2013

(54) METHOD AND SYSTEM FOR A SCALABLE RADIO ARCHITECTURE

(75) Inventors: James L. Lansford, Austin, TX (US); Robert T. Short, Vista, CA (US)

(73) Assignee: Alereon, Inc., Austin, TX (US)

( * ) Notice: Subject to any disclaimer, the term of this patent is extended or adjusted under 35 U.S.C. 154(b) by 135 days.

(21) Appl. No.: 13/205,401

(22) Filed: Aug. 8, 2011

(65) Prior Publication Data
US 2011/0292970 A1    Dec. 1, 2011

Related U.S. Application Data

(63) Continuation of application No. 11/051,552, filed on Feb. 4, 2005, now Pat. No. 8,018,831.

(60) Provisional application No. 60/542,326, filed on Feb. 6, 2004.

(51) Int. Cl.
*H04J 11/00*    (2006.01)

(52) U.S. Cl.
USPC .......................................... 370/208; 370/210

(58) Field of Classification Search
None
See application file for complete search history.

(56) References Cited

U.S. PATENT DOCUMENTS

| | | | | |
|---|---|---|---|---|
| 6,870,808 | B1 * | 3/2005 | Liu et al. | 370/203 |
| 6,987,752 | B1 * | 1/2006 | Sarraf et al. | 370/343 |
| 2003/0123383 | A1 * | 7/2003 | Korobkov et al. | 370/208 |
| 2005/0050130 | A1 * | 3/2005 | Dabak et al. | 708/426 |

\* cited by examiner

*Primary Examiner* — Jae Y Lee
(74) *Attorney, Agent, or Firm* — Sprinkle IP Law Group

(57) ABSTRACT

Systems and methods for a scalable architecture for radio device and systems are disclosed. This architecture employs a scalable bandwidth to deliver higher data rates and transmission ranges to devices that need them, while still delivering lower power solutions for devices which utilize a smaller bandwidth. These systems and methods may divide the available frequency spectrum into a set of fundamental sub-bands. Different devices may use various multiples of these sub-bands depending on their needs. Devices employing this architecture are also capable of interoperation with one another regardless of the bandwidth they utilize. A device may scan through each sub-band within which the device intends to operate, searching for a common beacon transmitted by other devices utilizing the sub-band. If a beacon is found the device can choose to interoperate with the other device or, alternatively, continue scanning the sub-bands until an unused sub-band is found.

16 Claims, 7 Drawing Sheets

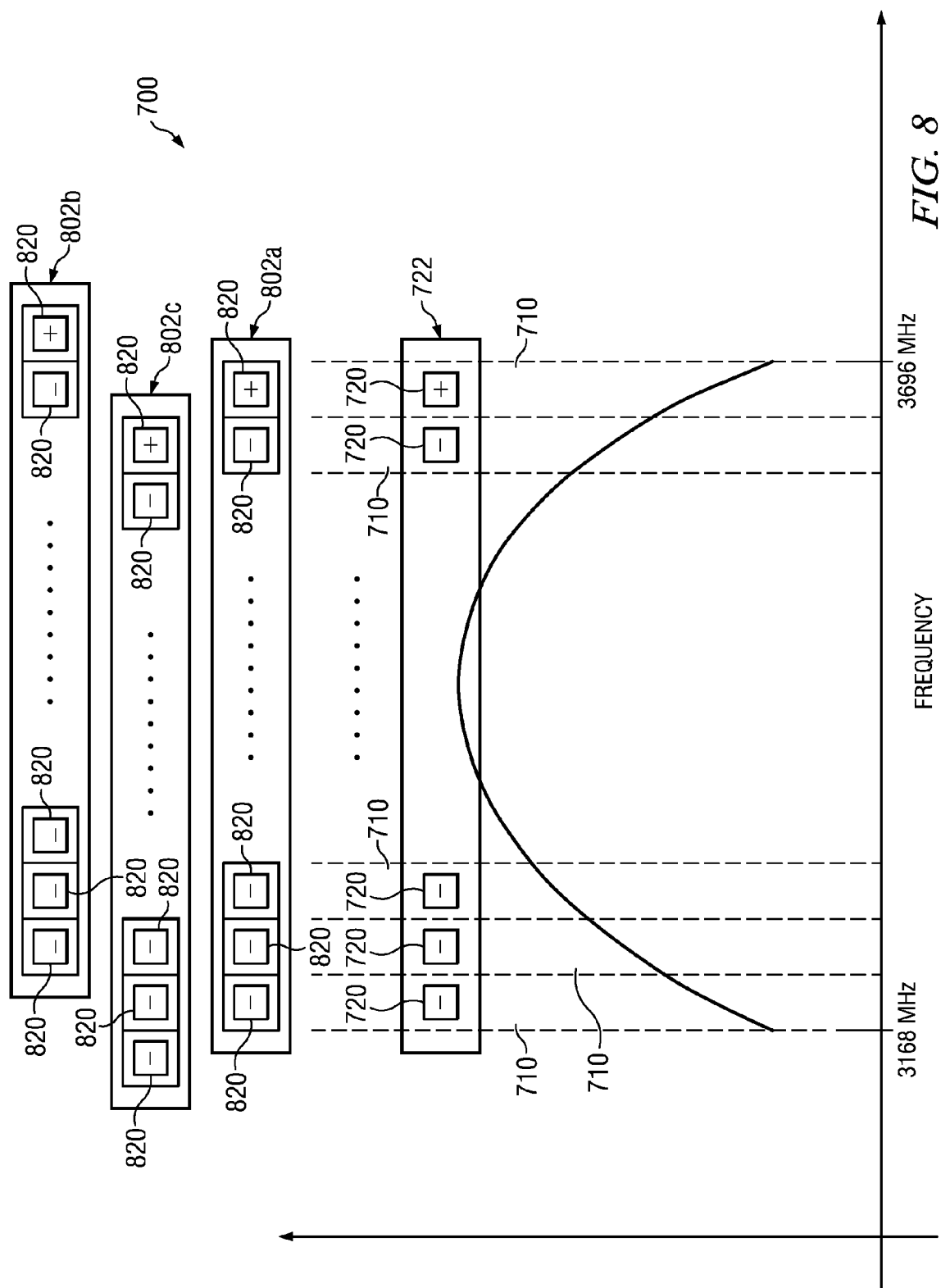

METHOD AND SYSTEM FOR A SCALABLE RADIO ARCHITECTURE

RELATED APPLICATIONS

This application is a continuation of, and claims a benefit of priority under 35 U.S.C. 120 of the filing date of U.S. patent application Ser. No. 11/051,552 by inventors James L. Lansford and Robert T. Short entitled "Method and System for a Scalable Radio Architecture" filed on Feb. 4, 2005, now U.S. Pat. No. 8,018,831 which claims a benefit of priority under 35 U.S.C. §119(e) to U.S. Provisional Patent Application No. 60/542,326 by inventors James L. Lansford and Robert T. Short entitled "Scalable Architecture For Ultra Wideband Networks" filed on Feb. 6, 2004, the entire contents of which are hereby expressly incorporated by reference for all purposes.

TECHNICAL FIELD OF THE INVENTION

The invention relates in general to methods and systems for wireless communications, and more particularly, to scalable architectures for wireless communications.

BACKGROUND OF THE INVENTION

Recently, wireless data, entertainment and mobile communications technologies have become increasingly prevalent, particularly in the household environment. The convergence of these wireless data, entertainment and mobile communications within the home has created the need for merging many disparate devices into a single wireless network architecture capable of seamlessly supporting and integrating the requirements of all of these devices. Seamless connectivity and rapid transfer of data, without confusing cables and wires for various interfaces that will not and cannot talk to each other, is a compelling proposition for a broad market.

Ideally, each of these device will cost effectively be capable of automatically discovering and securely communicating with every other device within its environment, and be capable of meeting any future connectivity requirements.

To that end, communication industry consortia such as the MultiBand OFDM Alliance (MBOA), Digital Living Network Alliance (DLNA) and the WiMedia Alliance are establishing design guidelines and standards to ensure interoperability of these wireless devices. For example, Wireless 1394, Wireless USB, and native IP-based applications are currently under development based on Ultrawideband (UWB) radio or WiMedia Convergence Platform.

Although it began as a military application dating from the 1960s, UWB has recently been utilized as a high data rate (480+Mbps), short-range (up to 20 meters) technology that is well suited to emerging applications in the consumer electronics, personal computing and mobile markets. When compared to other existing and nascent technologies capable wireless connectivity, the performance benefits of UWB are compelling. For example, transferring a 1 Gbyte file full of vacation pictures from a digital camera to a photo take merely seconds with UWB compared to hours using other currently available, technologies (i.e. Bluetooth) and consume far less battery power in doing so.

Typically, devices which employ UWB utilize a fixed channel bandwidth that is static in frequency, or a fixed channel bandwidth that can be frequency agile. In either case, the bandwidth utilized by a device must remain substantially fixed. Thus, the range and data rate of the device is, for the most part, determined by the modulation/coding of the signal, and the power with which the signal is transmitted. Additionally, because the bandwidth utilized by these devices is fixed, an architecture for these devices does not readily scale down to lower transmit power, lower bandwidth and performance or scale up to higher transmit power, wider bandwidth and performance. This architecture forces devices that do not need to transmit over a long range or cannot tolerate high power consumption to use suboptimal solutions, while compromising the performance of higher-end devices that need to operate at higher performance points Furthermore, this architecture exacerbates interoperability problems between wireless devices. Interference in a given spectrum varies with power levels, bandwidth ratios, and medium access methods and without any means of policing how systems behave. Applications that require significant wireless bandwidth are subject to the threat of punishing interference from a variety of devices, and devices in one network may be subject to interference from devices in another network, depending on the strength and location of these devices. Additionally, in many cases devices which employ a fixed frequency cannot interoperate with devices or networks which utilize different bandwidths.

Thus, as can be seen, there is a need for an architecture for radio devices and systems which allow wireless devices to be scaled while enabling interoperability between the devices and systems. A scalable architecture allows a system designer to mix small and wide bandwidth devices in a way that makes them interoperable, and allows a designer to take advantage of the unique attributes of each.

SUMMARY OF THE INVENTION

Systems and methods for a scalable architecture for radio device and systems are disclosed. This architecture employs a scalable bandwidth to deliver higher data rates and transmission ranges to devices that need them, while still delivering lower power consumption solutions for devices which utilize a smaller bandwidth. These systems and methods may divide the available frequency spectrum into a set of sub-bands. Different devices may use various multiples of these sub-bands depending on their needs. Devices employing this architecture are also capable of interoperation with one another regardless of the bandwidth they utilize. A device may scan through one or more sub-bands, searching for a common beacon transmitted by other devices utilizing the sub-band. If a beacon is found, the device can choose to interoperate with the other device or, alternatively, continue scanning the sub-bands until an unused sub-band is found.

In one embodiment, a wireless device may be capable of selecting a channel on which to transmit and transmitting on one or more of the sub-bands which may comprise the channel. This channel is selected from a plurality of sets of channels. Each one of the sets of channels has channels of a certain bandwidth, and each channel within a set has the same bandwidth. Each channel within a set of channels can be formed by aggregating an equal number of contiguous bandwidth sub-bands. Each of these sub-bands may be of equal and orthogonal bandwidths.

In another embodiment, the device can transmit a beacon on a sub-band.

In yet, another embodiment, this beacon may allow interoperation with other devices. Another device may find this beacon being transmitted and decide to interoperate with the device transmitting the beacon.

In still another embodiment, this beacon may consist of a pseudo random code such as gold codes, M-sequences, or Barker codes.

Aspects of the invention will provide the technical advantage of scalability of different devices, while simultaneously allowing interoperability between different devices with different bandwidths. This scalability allows low power, low bandwidth devices to interoperate with high power, high bandwidth devices. These advantages may allow device and network developers the latitude to design devices with a variety of price, performance or power attributes that are still interoperable with one another.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 8 depicts a block diagram of an embodiment of scanning for a beacon.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

Attention is now directed to systems and methods for a scalable architecture for radio device and systems. This architecture employs a scalable bandwidth to deliver higher data rates and transmission ranges to devices that need them, while still delivering lower power solutions for devices which utilize a smaller bandwidth. These systems and methods may divide an available frequency spectrum into a set of sub-bands. Different devices may use various multiples of these sub-bands depending on their needs. Certain devices may aggregate these sub-bands to achieve a higher bandwidth for higher data rates and longer ranges. Conversely, other devices may utilize the minimum bandwidth of the architecture to achieve transmissions over a shorter range at a lower power.

Devices employing this architecture are also capable of interoperation with one another regardless of the bandwidth utilized by the devices. A device may scan through one or more sub-bands searching for a common beacon transmitted by other compatible devices utilizing the sub-band. If a beacon is found the device can choose to interoperate with the other device or, alternatively, continue scanning the sub-bands until an unused sub-band is found. This type of scalable architecture gives developers of radio devices and systems the capability to design devices with a variety of price, performance and power attributes that are interoperable. Thus, low power, narrow bandwidth portable devices can coexist and interoperate with other radio devices designed for higher power, wider bandwidth, longer range or higher performance. By making devices and systems scalable, future performance needs can be anticipated, while allowing interoperability with devices conforming to current standards, rules or regulations.

Figure 1:
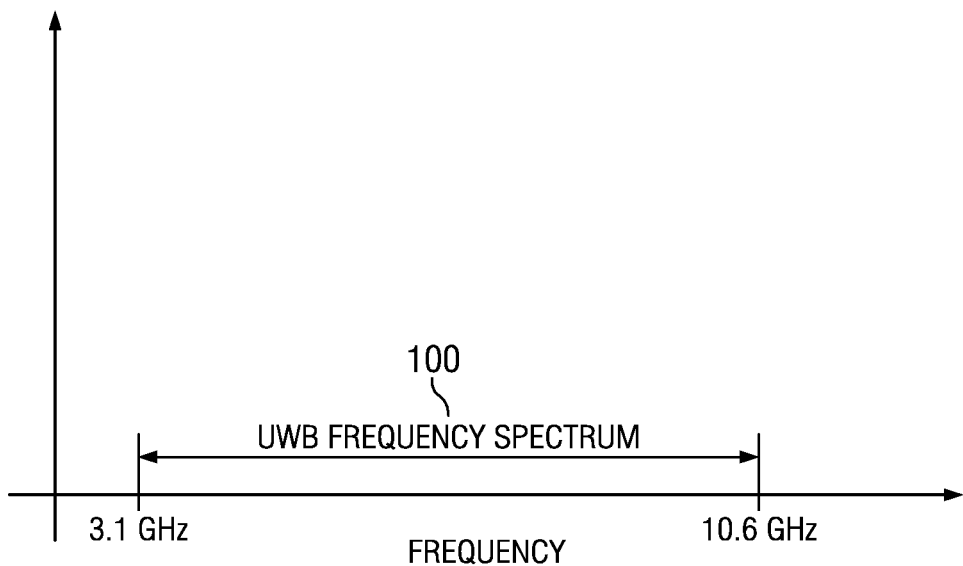
FIG. 1 depicts a frequency spectrum.

Before discussing specific embodiments of the present invention, exemplary frequencies and sub-bands for use in describing the present invention will be presented. Turning to FIG. 1, one embodiment of a frequency spectrum is illustrated. Frequency spectrum 100 encompasses the radio spectrum from 3.1 GHz to 10.6 GHz, and has been allocated by the FCC to "ultrawideband" technology. The term "ultrawideband" was first coined by the U.S. Department of Defense in 1989, and early applications leveraged the technology's properties as ground-penetrating radar.

Today, the definition for ultrawideband (UWB), according to the FCC, is any radio technology with a spectrum that occupies greater than 20 percent of the center frequency of a minimum of 500 MHz. Recognizing the advantages of new products that could incorporate this technology to benefit public safety, enterprise and consumer applications, in 2002 the FCC allocated radio spectrum 100 from 3.1 GHz to 10.6 GHz expressly for these purposes. Additionally, spectrum 100 is also available for use by medical, scientific, law enforcement, fire and rescue organizations. It is possible that the 500 MHz minimum bandwidth may be reduced in the future.

Rather than requiring a UWB radio to use this entire 7.5 GHz band to transmit information, or even a substantive portion of it, the FCC defined a specific minimum bandwidth of 500 MHz at a −41.3 dBm/MHz level. This minimum bandwidth (in conjunction with other requirements of the FCC ruling) substantially protect incumbent users of the spectrum. The flexibility provided by the FCC ruling greatly expands the design options for UWB communication systems. Designers are free to use a combination of sub-bands within the spectrum to optimize system performance, power consumption and design complexity. UWB systems can still maintain the same low transmit power as if they were using the entire bandwidth by interleaving the symbols across these sub-bands.

One such UWB technology which utilizes frequency spectrum 100 is orthogonal frequency division multiplexing (OFDM). OFDM transmits data simultaneously over multiple carriers spaced apart at precise frequencies. Fast Fourier Transform algorithms provide nearly 100 percent efficiency in capturing energy in a multi-path environment, while only slightly increasing transmitter complexity. Beneficial attributes of OFDM include high spectral flexibility and resiliency to RF interference and multi-path effects. Based on existing CMOS technology geometries, use of the spectrum from 3.1 GHz to 4.8 GHz is considered optimal for most deployments of OFDM. Limiting the upper bound also avoids interference with the band where 802.11a devices reside as well as simplifies the design of the radio and analog front end circuitry.

Figure 2:
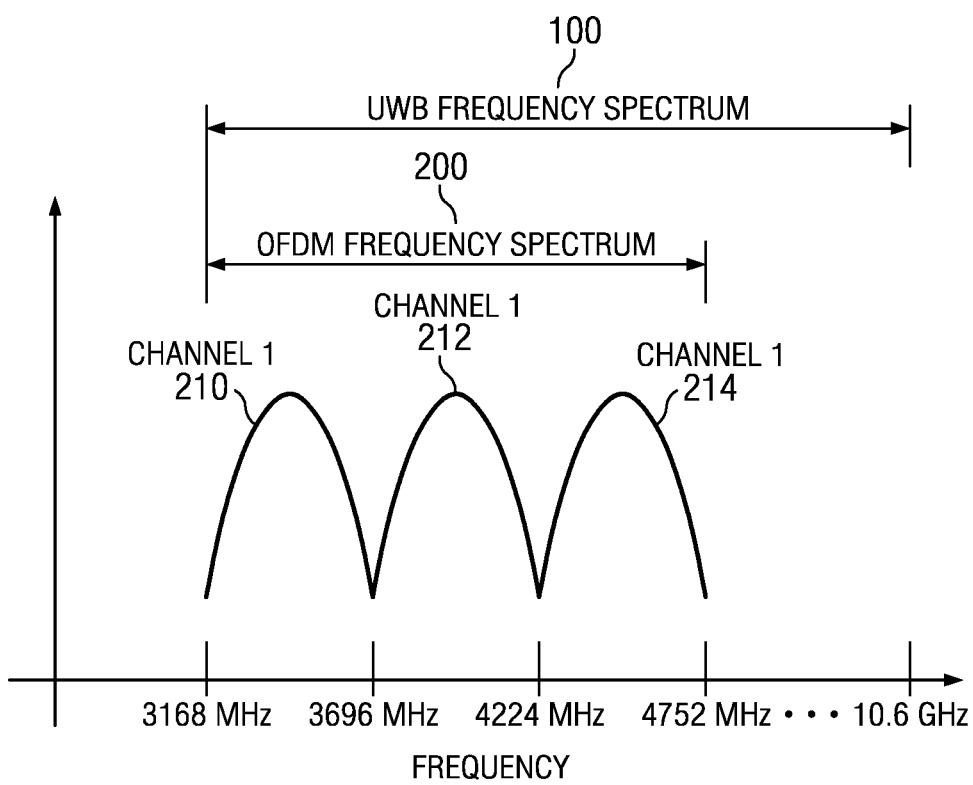
FIG. 2 depicts a frequency spectrum and embodiments of channels within a frequency spectrum.

Moving on to FIG. 2, one embodiment of a frequency spectrum and sub-bands of this frequency suitable for use with OFDM are illustrated. Frequency spectrum 200 from 3.1 GHz to 4.8 GHz is sufficient for three sub-bands 210, 212, 214 of 500 Mhz or greater, as provided for by the FCC. In this case, each of sub-bands 210, 212, 214 encompasses 528 Mhz of frequency spectrum 200, with the frequencies occupied by each sub-band 210, 212, 214 being substantially orthogonal to the other two sub-bands 210, 212, 214.

Figure 3:
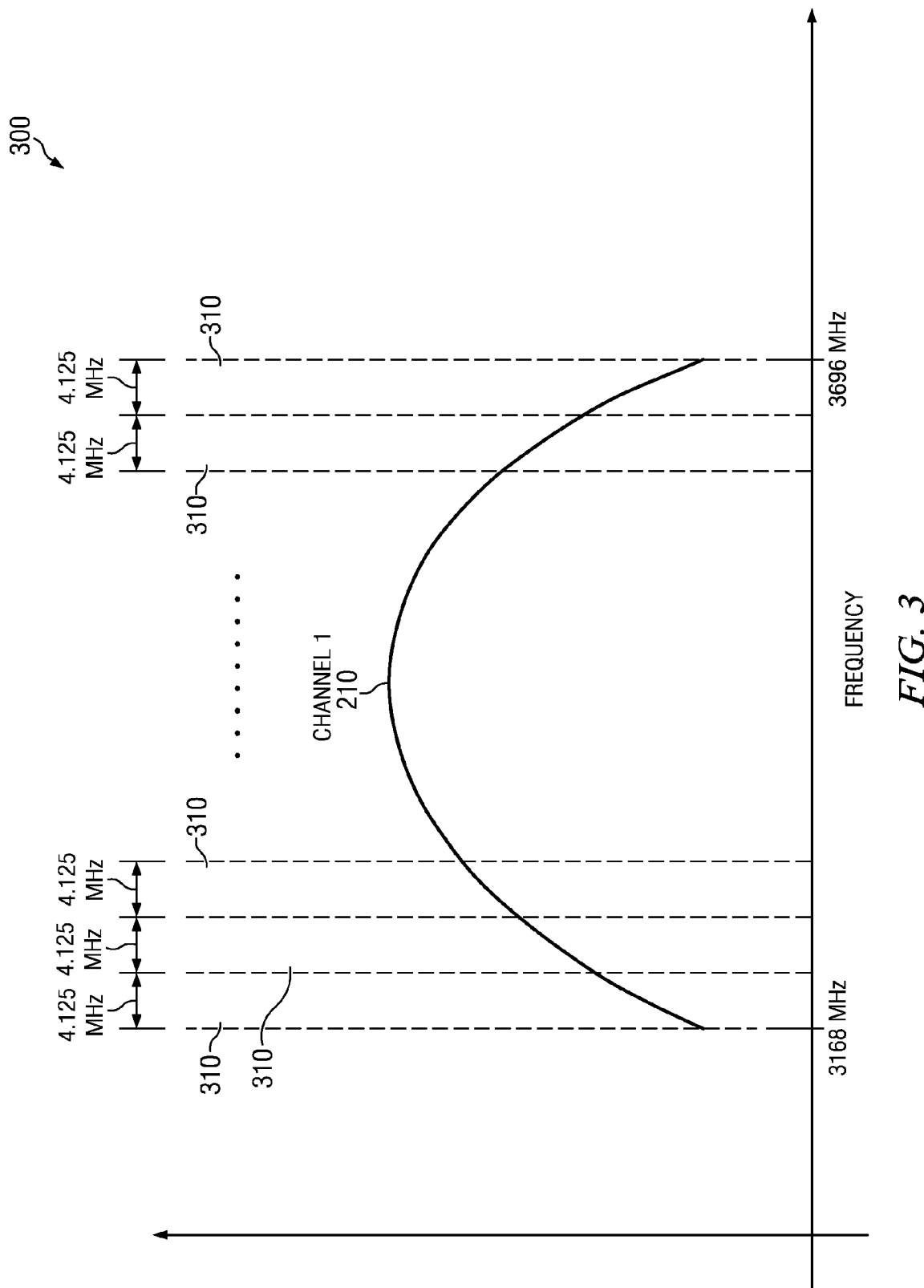
FIG. 3 depicts an embodiment of the division of a channel into tones.

When employing certain embodiments of OFDM, frequency spectrum 200 may be further divided into a number of tones. FIG. 3 illustrates one embodiment of the division of a frequency spectrum into a number of tones. Frequency spectrum 300 represents the portion of frequency spectrum 200 encompassed by sub-band 210. Sub-band 210 may be divided into a number of substantially orthogonal tones 310, each tone 310 encompassing 4.125 Mhz of the frequency spectrum. Thus, sub-band 210, which encompasses 528 Mhz of frequency spectrum 200, may be divided into 128 tones 310, each encompassing 4.125 Mhz. A device employing OFDM modulates data onto tones 310 which may then be received on tones 310 and demodulated by another device employing OFDM. The information may be modulated onto a tone by adjusting the tone's phase, amplitude, or both.

Figure 4:
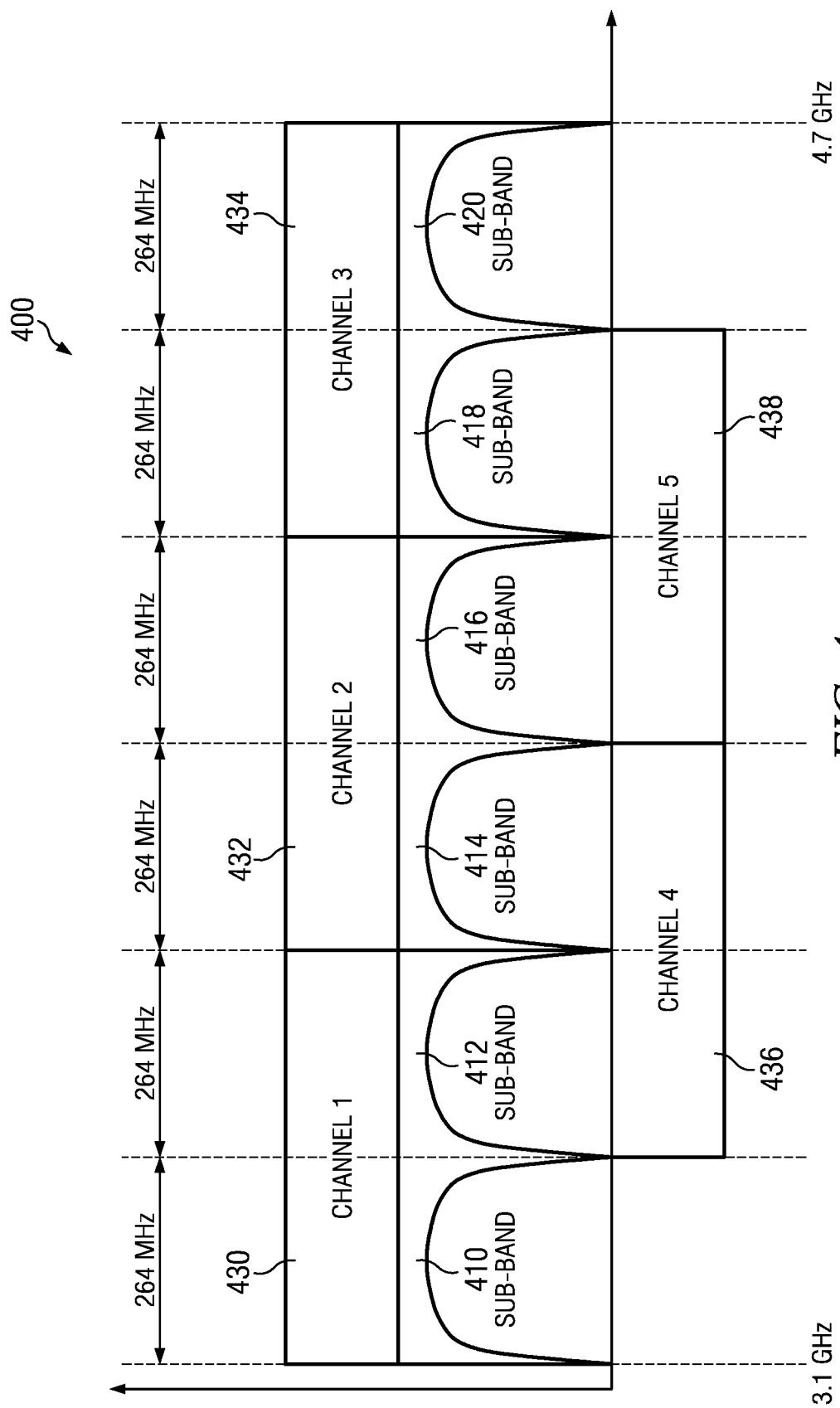
FIG. 4 depicts a block diagram of divisions of a frequency spectrum suitable for implementing an architecture of the present invention.

Turning now to FIG. 4, one embodiment of a division of a frequency spectrum which may be employed by the systems and methods of the present invention is illustrated. Certain embodiments of the present invention may transmit over frequency spectrum 400, which encompasses the frequency range from 3.1 GHz to 4.7 GHz. Frequency spectrum 400 may be divided into a set of six fundamental sub-bands 410, 412, 414, 416, 418, 420 of 264 MHZ each, each sub-band 410, 412, 414, 416, 418, 420 comprising 64 4.125 MHZ tones, similarly to FIG. 3. These six sub-bands 410, 412, 414, 416, 418, 420 may be aggregated by devices employing the systems and methods of the present invention into a set of channels having the bandwidth desired by the device, and one of these channels, or a subset of a channel may be used to transmit depending on the environment of the device. Clearly, the width of the sub-bands in FIG. 3 could be smaller or larger.

Supposing that for a particular implementation of the present invention the minimum desired bandwidth for any device is 528 MHz. This set of six fundamental sub-bands 410, 412, 414, 416, 418, 420 can be aggregated into five channels 430, 432, 434, 436, 438, each of these channels 430, 432, 434, 436, 438 comprising two contiguous sub-bands 410, 412, 414, 416, 418, 420 and encompassing the minimum bandwidth of the architecture: 528 MHz. For example, channel 430 comprises sub-bands 410, 412, channel 432 comprises sub-bands 414, 416, channel 434 comprises sub-bands 418, 420, channel 436 comprises sub-bands 412, 414 and channel 438 comprises sub-bands 416, 418. Three of these channels 430, 432, 434 are completely orthogonal to one another, while the other two channels 436, 438 overlap at least two of the first three channels 430, 432, 434. Thus, a device employing this particular implementation which wishes to transmit at the minimum bandwidth for this particular architecture may transmit on any of channels 430, 432, 434, 436 or 438.

Some devices employing this particular implementation of the architecture may, however, need to transmit over a longer range, at a higher power, or at a greater data rate than the minimum bandwidth that a particular implementation of the architecture provides. To achieve these higher power, longer range or greater rate transmissions, therefore, these devices may aggregate fundamental sub-bands of the architecture to form channels which encompass a greater frequency range than that provided by the minimum bandwidth of the architecture employed.

Figure 5:
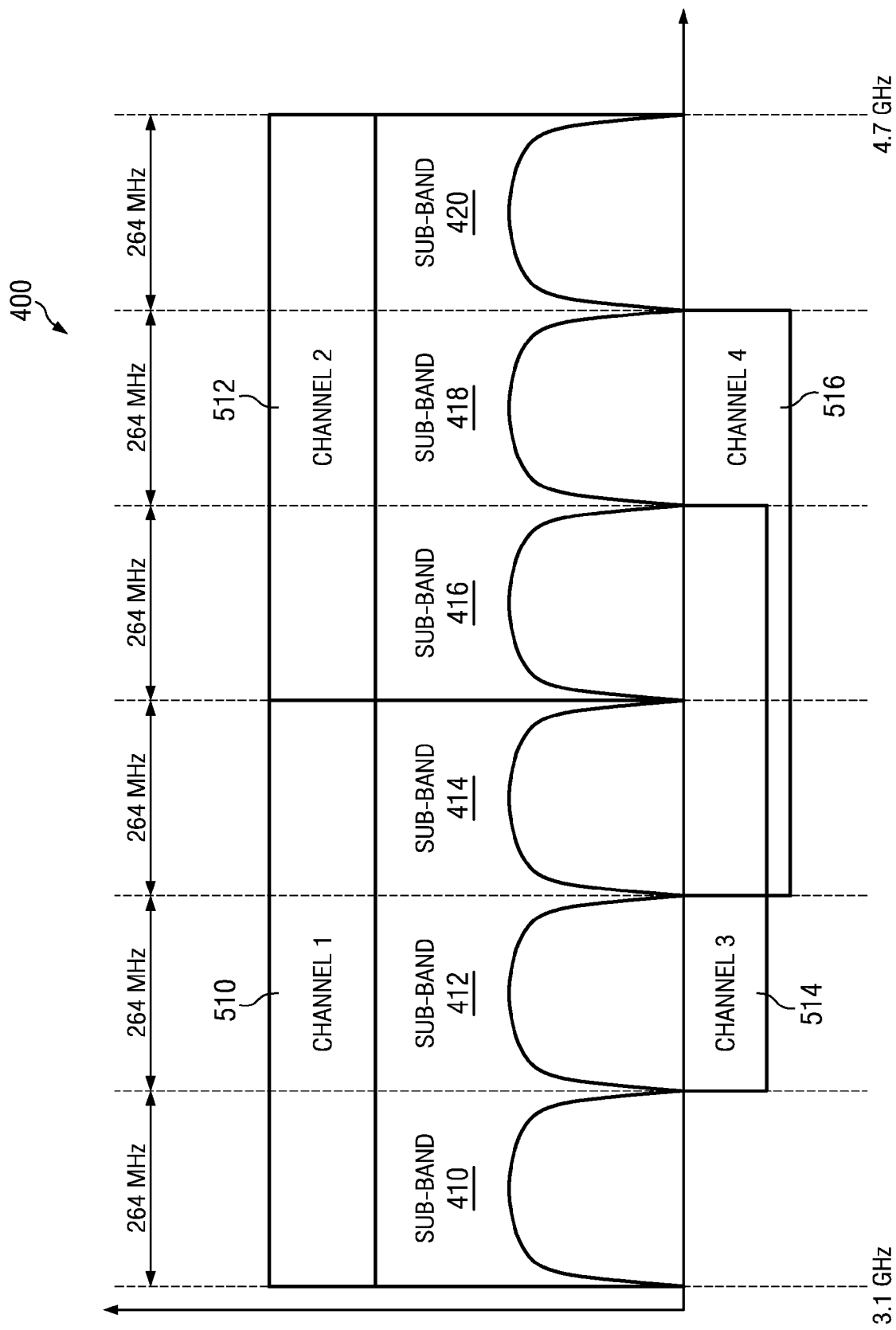
FIG. 5 depicts a block diagram of divisions of a frequency spectrum suitable for implementing an architecture of the present invention.

FIG. 5 depicts one embodiment of how the set of fundamental sub-bands of an architecture may be aggregated, employing the exemplary frequency spectrum and set of fundamental sub-bands depicted with respect to FIG. 4. Continuing with the above example, frequency spectrum 400 is divided into a set of six fundamental sub-bands 410, 412, 414, 416, 418, 420 of 264 MHZ each, with each sub-band 410, 412, 414, 416, 418, 420 comprising 64 4.125 MHZ tones and the minimum desired bandwidth for any device being 528 MHz. These six fundamental sub-bands 410, 412, 414, 416, 418, 420 can be aggregated to form four channels 510, 512, 514, 516, each of these channels 510, 512, 514, 516 comprising three contiguous sub-bands 410, 412, 414, 416, 418, 420 and encompassing 792 MHz of bandwidth. For example, channel 510 comprises sub-bands 410, 412 and 414, channel 512 comprises sub-bands 416, 418 and 420, channel 514 comprises sub-bands 412, 414 and 416, and channel 516 comprises sub-bands 414, 416 and 418. Two of these channels 510, 512 are completely orthogonal to one another, while the other two channels 514, 516 overlap at the first two channels 510, 512. Thus, a device employing this particular architecture which wishes to transmit above the minimum bandwidth for this particular architecture (i.e. 528 MHz) may transmit on any of channels 510, 512, 514 or 516. However, since these channels 510, 512, 514 or 516 are based on the same six sub-bands 410, 412, 414, 416, 418, 420, and the bandwidth of the tones used by this device will be substantially the same as those of the tones used by the device described with respect to FIG. 4, the higher bandwidth devices described with respect to FIG. 5 which transmit utilizing 792 MHZ channels 510, 512, 514 or 516 may interoperate with devices employing channels 430, 432, 434, 436 or 438 to transmit at a bandwidth of 528 MHZ as described with respect to FIG. 4.

It will be apparent to those of skill in the art that this set of fundamental sub-bands of the architecture may be aggregated to form channels of any size which is a multiple of the size of the fundamental sub-band of a particular implementation, and devices requiring even longer ranges or greater bandwidths may utilize these channels. To continue yet again with the above example, channels consisting of four sub-bands may be formed, with each channel having a 1056 MHz bandwidth; channels consisting of five sub-bands may be formed, with each channel having a 1320 MHz bandwidth, etc.

It will also be apparent that any frequency spectrum, minimum bandwidth, tone bandwidth or fundamental sub-band size may be utilized to implement the systems and methods of the present invention. For example, if the fundamental sub-band size is chosen as 132 MHz and the minimum bandwidth desired for any device is 660 Mhz, five sub-bands may be aggregated to form channels of the requisite minimum bandwidth, and these parameters may be employed in the frequency spectrum from 4.7 GHz to 10.6 GHz. Likewise, in regulatory domains that allow it, systems could be built with as few as one sub-band, and systems could aggregate an arbitrary number of sub-bands to operate over as wide a bandwidth as practical.

By employing this scalable architecture, the bandwidth of devices may be scaled down to transmit at the minimum bandwidth of the architecture and scaled up to transmit at higher bandwidths. This architecture may also be used improve the interoperability characteristics of the devices employing the architecture. More precisely, devices may now engage in selecting appropriate channels based on factors present in their environment such as their desired bandwidth, the presence of other devices, the power of these other devices, interference and if the device wishes to inter-operate with other devices employing the same architecture.

Figure 6:
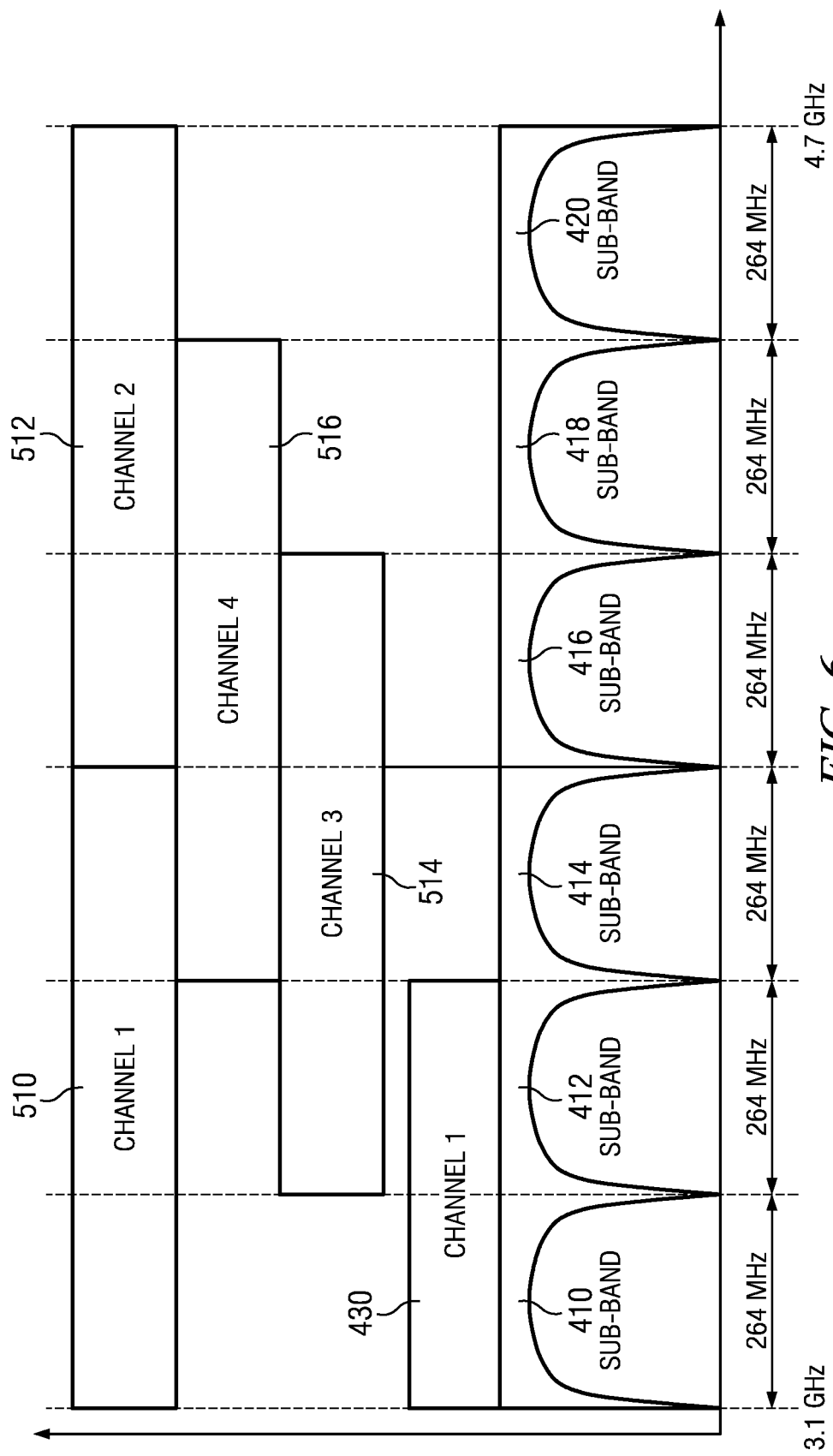
FIG. 6 depicts a block diagram of an embodiment of channel selection.

Each device which employs a substantially similar architecture (i.e. utilizes similar frequency spectrums and has fundamental sub-bands and tones of substantially the same size) may periodically transmit a common beacon on each of the sub-bands which it utilizes. A device may scan through each fundamental sub-band within the channel on which the device intends to operate, or is currently operating, searching for this common beacon transmitted by compatible devices already utilizing these sub-bands. If this common beacon is found in one or more of the sub-bands in the channel, the device can choose to interoperate with the other device transmitting in the sub-band or, alternatively, continue scanning the sub-bands until one or more unused sub-bands is found and transmit on a channel encompassing that unused sub-band FIG. 6 graphically depicts an example of this methodology for channel selection. Suppose that two devices operate according to the architecture depicted with respect to FIGS. 4 and 5, with the first device utilizing a bandwidth of 528 MHZ as depicted in FIG. 4 and the second device desiring to utilize a bandwidth of 792 MHz as depicted in FIG. 5. Suppose further that the first device is operating on channel 430 encompassing sub-bands 410 and 412.

Now suppose that the second device wishes to transmit on channel 514, encompassing sub-bands 412, 414 and 416. In this case, the second device will scan sub-bands 412, 414 and 416 to determine if any other devices are operating within any of those sub-bands 412, 414, 416. After scanning each of sub-bands 412, 414 and 416, the second device will discover that sub-band 412 is being utilized. The second device may then choose to inter-operate with the first device operating in sub-band 412, thus forming a network of devices, or piconet, with the first device, or joining a piconet to which the first device already belongs. To accomplish this, the first device may restrict transmissions intended for the first device to the bandwidth of sub-band 412 within which the first device operates.

Alternatively, the second device may not wish to interoperate with the first device. In this case, the first device may restrict its transmissions to sub-bands 414 and 416, such that the transmissions of the second device do not interfere with the first device. If, however, the second device needs to utilize more bandwidth than can be accommodated by two sub-bands 414, 416 the second device may scan the remainder of sub-bands 410, 414, 416, 418 and 420 to find three or more contiguous unused sub-bands. The second device may then transmit on a channel which encompasses these unused sub-bands. For example, channel 512, encompassing unused sub-bands 416, 418 and 420, or channel 516 encompassing unused sub-bands 414, 416 and 418.

It will be apparent to those of skill in the art that channel selection by the second device may also occur after scanning one or more sub-bands 410, 412, 414, 416, 418, and 420 within which the second device may operate. For example, referring again to FIG. 6, after scanning sub-bands 410, 412, 414, 416, 418, 420 the second device detects that both sub-band 410 and 412 are being utilize. If, at that point the second device wishes to inter-operate with the first device it may choose to operate on channel 510 encompassing sub-bands 410, 412 and 414, such that the first and second devices may communicate using the widest possible bandwidth. Alternatively, at this point the second device may choose to operate on channel 516 encompassing sub-bands 414, 416 and 418, such that the first and second devices are operating on substantially distinct portions of the frequency spectrum.

It will also be apparent that this channel selection process may occur at any point before or during the operation of any device. For example, if a device detects another device operating on one or more of the sub-bands within which it is currently operating, or interference on a sub-band within which it is currently operating it may begin transmitting on another channel which does not encompass that sub-band. These capabilities may also allow a device to function as a bridge between devices operating on different sub-bands. For example, if one device operates on one sub-band while another device operates on another sub-band. By choosing to transmit on both of those sub-bands a third device may communicate with both of these devices, and additionally may serve as an intermediary for communications between those devices.

To inter-operate, or conversely choose not to inter-operate, with other devices, it is therefore helpful to be able to discern compatible devices. In one embodiment, each device employing a common architecture transmits a common beacon in each sub-band within which the device operates. A new device can scan through each sub-band searching for this common beacon. If such a common beacon is found in a particular sub-band the new device can choose to inter-operate with the device or devices using that sub-band, or continue scanning until one or more unused sub-bands are found, as depicted above with respect to FIG. 5. This methodology allows piconets to be established between devices with a minimum chance of interference with surrounding piconets or other wireless systems and devices.

Figure 7:
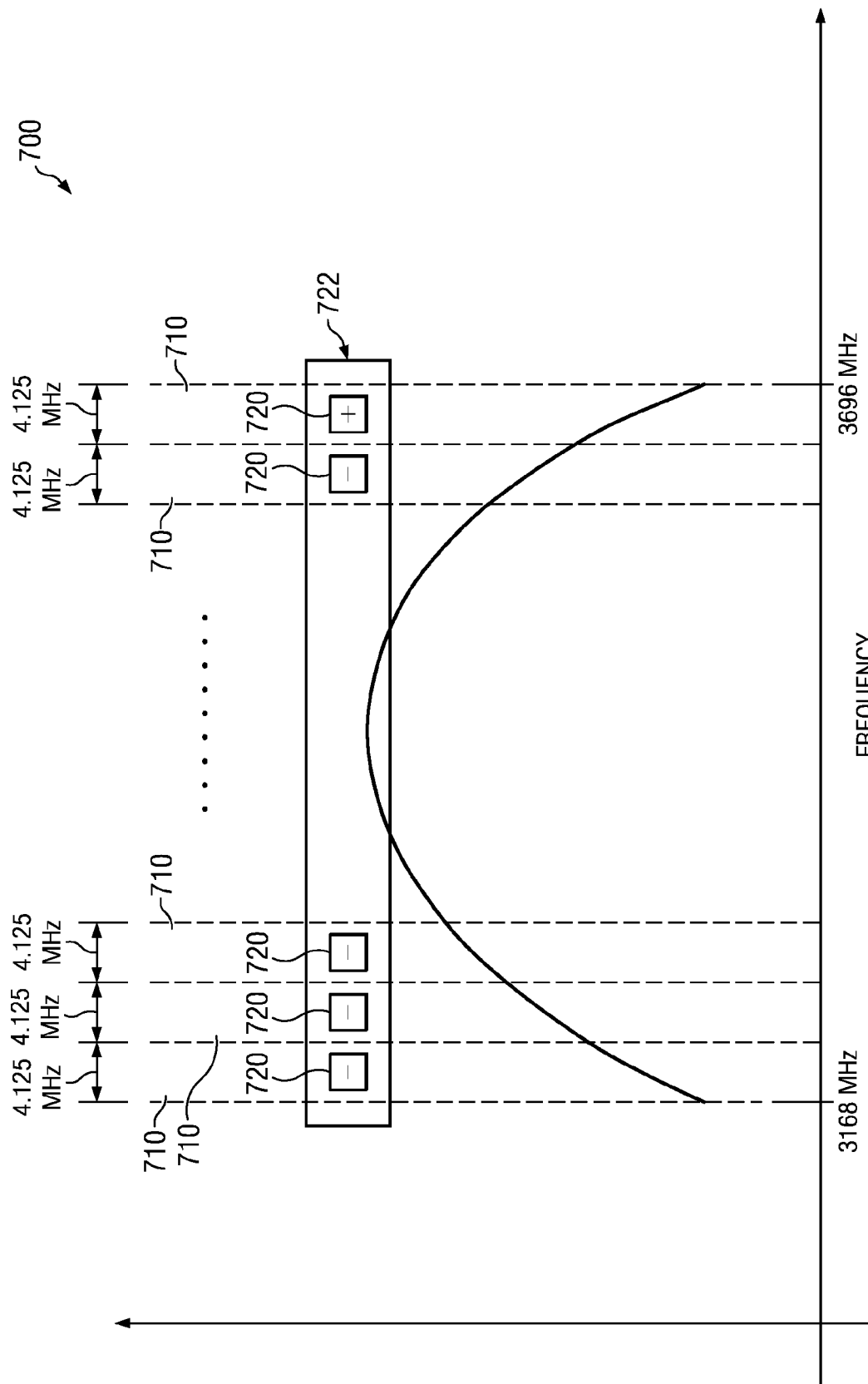
FIG. 7 depicts a block diagram an embodiment of transmitting a beacon.

FIG. 7 graphically depicts one embodiment of transmitting a common beacon in a sub-band. Similarly to FIG. 3 above, sub-band 700 may be divided into a number of tones 710. To employ OFDM, each of these tones 710 may be 4.125 MHz in width. Thus, if sub-band 700 encompasses 264 MHz, sub-band 700 comprises 64 tones 710. A device transmitting on sub-band 700 may wish to identify to compatible devices that it is utilizing sub-band 700. To that end, the device may transmit a common beacon utilized by all devices of substantially similar architecture on sub-band 700 for other compatible devices to identify. Though any type of information may be used as a common beacon, ideally the common beacon used will have low cross correlation properties to make identification of the common beacon not only easier, but more robust as well. Therefore, it may be desirable to employ a pseudo random code with low cross correlation properties or a bounded cross correlation such as M-sequences, Barker codes, Walsh sequences, Gold codes etc. as a common beacon. Cross correlation is a statistical measure timing the movements and proximity of alignment between two different information sets of a series of information. A pseudo random code with almost ideal auto correlation properties may produce a single peak and uniformly low sidelobes when correlated against time shifted versions of itself. While any pseudo random code with an auto-correlation less than one for non-zero lag may be used in embodiments of the present invention, it will be understood that the auto-correlation of a pseudo random code may be related to the length of the pseudo random code employed. Thus, the pseudo random code chosen may be optimized for both length and auto-correlation. Hence, a pseudo-random code with an auto-correlation value of 0.5 for non-zero lag may provide suitably low cross-correlation in certain instances, while a pseudo-random code with an auto-correlation value of 0.2 or less for non-zero lag may be preferable still.

In one embodiment, a device employing OFDM and utilizing sub-band 700 may utilize a pseudo random code of length 64 as a common beacon and transmit this beacon at a regular interval as a symbol. To transmit the pseudo random code, the device transmits each digit 720 of symbol 722 encoded in frequency on each tone 710 of sub-band 700. Each of the digits 720 corresponds to a digit in the pseudo random code of length 64 being used as a common beacon, wherein the pseudo random code could be composed of concatenated Barker sequences. Thus, a "+1" or a "−1" is transmitted as digit 720 on each of tones 710. Because transmitting a "+1" or a "−1" requires the same amount of energy, the power spectrum required to transmit this pseudo random code may be relatively flat.

Similarly, by using this same common beacon, compatible devices transmitting in a sub-band may be identified by another compatible device. FIG. 8 graphically depicts one embodiment of identifying another compatible device transmitting on a sub-band. In one embodiment, a device wishing to identify other compatible devices may use the common beacon to scan the frequencies within which it operates to identify other devices broadcasting the common beacon.

A device employing OFDM and utilizing sub-band 700 may transmit symbol 722 comprised of digits 720 on each tone 710 of sub-band 700 at a certain interval as depicted with respect to FIG. 7. Each of the digits 720 corresponds to a digit in a pseudo random code of length 64, wherein the pseudo random code could be composed of concatenated Barker sequences or other pseudo random sequences. Another device may use the same common beacon to scan the sub-bands within which it operates to identify compatible devices operating in the same sub-bands.

In one embodiment, this device uses 64 length pseudo random code 802 to scan through the sub-bands which the device uses, or which the device intends to use. The device receives symbol 722 encoded in the frequency domain of sub-band 700 such that the device can receive and decode symbol 722 and recreate the encoded length 64 pseudo random code. When each digit 820 of the 64 length pseudo random code 810 is substantially identical to digit 720 transmitted in each tone 710 of sub-band 700 (as shown in time aligned pseudo random code 802*a*), because of the cross correlation properties of the 64 length pseudo random code 802, this indicates that not only is another device transmitting on sub-band 700, but this other device employs the same architecture and is compatible. Based on the determination that another compatible device is transmitting utilizing sub-band 700, a decision may be made whether to interoperate with this device, or to continue scanning the remaining frequency spectrum until one or more unused sub-bands are located, and transmit on one or more of these unused sub-bands. Notice that because of the low cross correlation property of pseudo random code 802, there is little chance of misidentifying which sub-bands are being utilized as the sum of the cross products between the common beacon being utilized by the scanning device and the common beacon transmitted is relatively high at anything but a zero lag (as shown in 802*b*, 802*c*).

In a similar embodiment, each device will additionally transmit the bandwidth which it occupies along with the common beacon. Thus, once a compatible device is found by a scanning device the scanning device use this information to decide which channels or sub-bands to utilize for its transmissions.

It will be understood by those of skill in the art, that though scanning in the frequency domain has been explained with respect to a sub-band, the same scanning can occur with respect to a minimum bandwidth of an architecture or any arbitrarily selected size. It will also be understood that the same methodologies can apply to a smaller bandwidth device scanning for a large bandwidth device and conversely, a large bandwidth device scanning for a small bandwidth device.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for implementing a scalable architecture for wireless devices, comprising:
   selecting, by a first wireless device, a first channel on which to transmit, wherein:
      the first channel is selected from a first set of channels having a first bandwidth,
      the first set of channels is one of a plurality of sets of channels, each set of channels of the plurality of sets of channels comprises channels of the same bandwidth and the bandwidth of the channels of each set of channels is different from the bandwidth of the channels of the other sets of channels, and
      the one or more channels of each of the plurality of sets of channels is formed from a number of contiguous bandwidth sub-bands from a set of sub-bands, each sub-band of the set of sub-bands being of substantially equal bandwidth and comprising substantially different frequencies with respect to the other sub-bands in the set of sub-bands;
   transmitting, by the first wireless device, on at least a first sub-band of the first channel;
   receiving, by the first wireless device, a signal transmitted by a second wireless device on at least one sub-band of a second channel, wherein the at least one sub-band comprises the first sub-band and wherein:
      the second channel was selected by the second device based on one or more factors present in an operating environment where the second wireless device resides, the second channel was selected from a second set of channels of the plurality of sets of channels, the second set of channels having a second bandwidth that is different from the first bandwidth, and the second channel of the second set of channels comprises the first sub-band.

2. The method of claim 1, wherein the one or more factors comprises the presence of the first device.

3. The method of claim 1, wherein the one or more factors comprises a power level of the first device.

4. The method of claim 1, further comprising transmitting, by the first wireless device, a first beacon on the first sub-band, wherein the one or more factors comprises the presence of the first beacon.

5. The method of claim 4, wherein the first beacon is transmitted at a regular interval.

6. The method of claim 4, wherein selecting, by the second wireless device, the second channel on which to transmit comprises scanning one or more of the set of sub-bands of the second channel for the first beacon transmitted by the first wireless device transmitting on the first sub-band.

7. A method for implementing a scalable architecture for wireless devices, comprising:

selecting, by a first wireless device, a first channel on which to transmit, wherein:
the first channel is selected from a first set of channels having a first bandwidth,
the first set of channels is one of a plurality of sets of channels, each set of channels of the plurality of sets of channels comprises channels of the same bandwidth and the bandwidth of the channels of each set of channels is different from the bandwidth of the channels of the other sets of channels, and
the one or more channels of each of the plurality of sets of channels is formed from a number of contiguous bandwidth sub-bands from a set of sub-bands, each sub-band of the set of sub-bands being of substantially equal bandwidth and comprising substantially different frequencies with respect to the other sub-bands in the set of sub-bands;

transmitting, by the first wireless device, on at least a first sub-band of the first channel;

selecting, by a second wireless device, a second channel, different from the first channel, on which to transmit based on the transmissions of the first wireless device on the first sub-band of the first channel, wherein the second channel is selected from a second set of channels of the plurality of sets of channels, and a second channel of the second set of channels is comprised of one or more sub-bands including the first sub-band; and transmitting, by the second wireless device, on at least the first sub-band of the second channel.

8. The method of claim 7, wherein the first set of channels is the same as the second set of channels.

9. A wireless devices, comprising:
a processor; and
a computer readable memory,
wherein the wireless device is configured to:
select a first channel on which to transmit, wherein:
the first channel is selected from a first set of channels having a first bandwidth,
the first set of channels is one of a plurality of sets of channels, each set of channels of the plurality of sets of channels comprises channels of the same bandwidth and the bandwidth of the channels of each set of channels is different from the bandwidth of the channels of the other sets of channels, and
the one or more channels of each of the plurality of sets of channels is formed from a number of contiguous bandwidth sub-bands from a set of sub-bands, each sub-band of the set of sub-bands being of substantially equal bandwidth and comprising substantially different frequencies with respect to the other sub-bands in the set of sub-bands;
transmit on at least a first sub-band of the first channel;
receive a signal on at least one sub-band of a second channel, wherein the at least one sub-band comprises the first sub-band and wherein:
the second channel was selected by another wireless device based on one or more factors present in an operating environment where the other wireless device resides,
the second channel was selected from a second set of channels of the plurality of sets of channels, the second set of channels having a second bandwidth that is different from the first bandwidth,
and the second channel of the second set of channels comprises the first sub-band.

10. The system of claim 9, wherein the one or more factors comprises the presence of the first device.

11. The system of claim 9, wherein the one or more factors comprises a power level of the first device.

12. The system of claim 9, wherein the wireless device is configured to transmit a first beacon on the first sub-band, wherein the one or more factors comprises the presence of the first beacon.

13. The system of claim 12, wherein the first beacon is transmitted at a regular interval.

14. The system of claim 12, wherein selecting the second channel on which to transmit comprises scanning one or more of the set of sub-bands of the second channel for the first beacon transmitted by the first wireless device transmitting on the first sub-band.

15. A system for interoperable wireless devices, comprising
a first wireless device, comprising;
a processor; and a computer readable memory, wherein the first wireless device is configured to:
select a first channel on which to transmit wherein:
the first channel is selected from a first set of channels having a first bandwidth,
the first set of channels is one of a plurality of sets of channels, each set of channels of the plurality of sets of channels comprises channels of the same bandwidth and the bandwidth of the channels of each set of channels is different from the bandwidth of the channels of the other sets of channels, and
the one or more channels of each of the plurality of sets of channels is formed from a number of contiguous bandwidth sub-bands from a set of sub-bands, each sub-band of the set of sub-bands being of substantially equal bandwidth and comprising substantially different frequencies with respect to the other sub-bands in the set of sub-bands; and
transmit on at least a first sub-band of the first channel; and
a second wireless device, comprising:
a processor; and
a computer readable memory,
wherein the second wireless device is configured to:
select a second channel, different from the first channel, on which to transmit based on the transmissions of the first wireless device on the first sub-band of the first channel, wherein the second channel is selected from a second set of channels of the plurality of sets of channels, and a second channel of the second set of channels is comprised of one or more sub-bands including the first sub-band; and transmit on at least the first sub-band of the second channel.

16. The system of claim 15, wherein the first set of channels is the same as the second set of channels.

* * * * *